Oct. 3, 1972   T. H. SHEPHERD ET AL   3,695,921
METHOD OF COATING A CATHETER
Original Filed Aug. 13, 1968
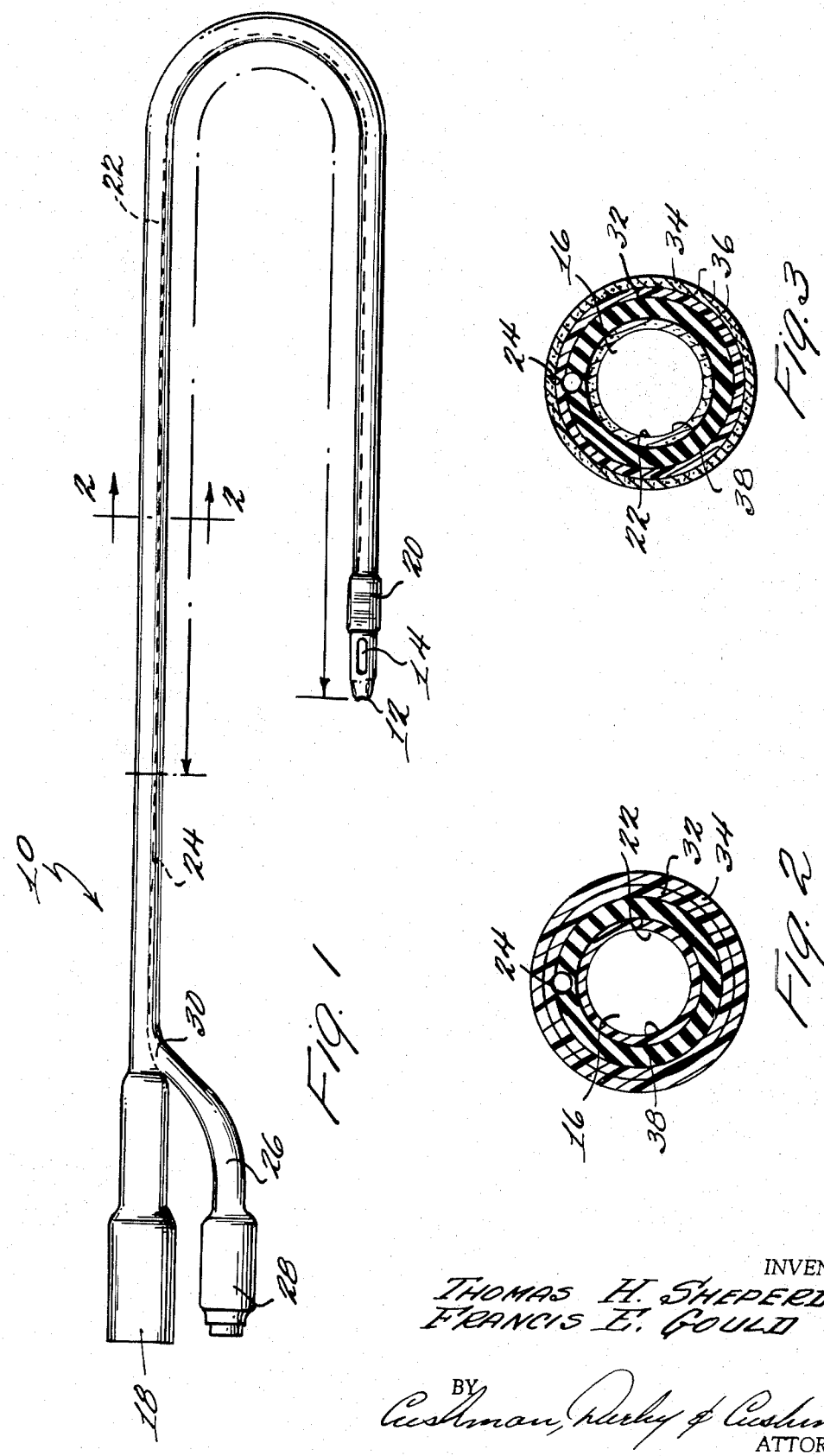
INVENTORS
THOMAS H. SHEPERD
FRANCIS E. GOULD
BY
Cushman, Darby & Cushman
ATTORNEYS 3,695,921
METHOD OF COATING A CATHETER
Thomas H. Shepherd, Hopewell, and Francis E. Gould, Princeton, N.J., assignors to National Patent Development Corporation, New York, N.Y.
Division of application Ser. No. 752,221, Aug. 13, 1968, now Patent No. 3,566,874, and a continuation-in-part of applications Ser. No. 576,856, July 26, 1966, now Patent No. 3,520,949, Ser. No. 650,259, June 30, 1967, and Ser. No. 654,044, July 4, 1967. This application Sept. 9, 1970, Ser. No. 70,722
Int. Cl. A61m 25/00; B44d 1/22
U.S. Cl. 117—72   14 Claims

ABSTRACT OF THE DISCLOSURE

Catheters are provided with coating of a hydrophilic acrylate or methacrylate polymer. The coating reduces the irritation and infection normally accompanying the use of catheters. Infection can be reduced still further by absorbing an antibiotic in the coating.

---

The present application is a continuation-in-part of application Ser. No. 654,044, filed July 4, 1967; application Ser. No. 650,259, filed June 30, 1967 and now abandoned; and application Ser. No. 567,856, filed July 26, 1966 and now Pat. 3,520,949, issued July 21, 1970 and is a division of application 752,221, filed Aug. 13, 1968, now Pat. 3,566,874, March 2, 1971.

The present invention relates to coated catheters and to binding hydrophilic polymers to rubber.

One of the problems normally encountered in the use of catheters is the risk of infection.

It is an object of the present invention to reduce the danger of infection which frequently occurs in the use of catheters.

Another object is to bond hydrophilic polymers to rubber and similar materials.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by coating a catheter with hydrophilic acrylate and methacrylate polymer. The use of the acrylate or methacrylate polymer by itself is effective in preventing infections. Even better results in reducing infection are obtained if the polymer is impregnated with an antibiotic or germicide.

The present invention is useful with either cannulae catheters or ureteral catheters. The ureteral catheters are normally made of natural rubber but can be made of synthetic rubbers, e.g. poly cis isoprene, butadiene-styrene copolymer, butyl rubber, silicone rubber, e.g. poly dimethyl siloxane, neoprene (polychloroprene).

The cannulae catheters can be made of the same kinds of materials or of polyvinyl chloride.

The coating of the hydrophilic acrylate or methacrylate is normally applied by dipping the catheter in a casting syrup of the monomer or partially polymerized monmer and then completing the polymerization. A thicker coating can be obtained by dipping this coated product again in a casting syrup and polymerizing. Preferably the undercoat is cross linked since it has been found that the uncross-linked hydrophilic acrylates and methacrylates do not adhere well to rubber or the like although they will adhere well to a cross-linked copolymer which has been applied as a coating to the rubber. The monomer or partial polymer casting syrup wherein a cross linking agent is employed penetrates the rubber and swells it slightly. The casting syrup is then polymerized while the rubber is in the swollen condition. As stated more polymerizable hydrophilic material can be bonded to this to build up the thickness. The second coating of hydrophilic material need not be the same as the undercoat.

To increase the effectiveness against infection the coated catheter (either with a single or plural coating of hydrophilic polymer) is immersed in a solution of an antibiotic or germicide. The antibiotic or germicide is then retained by the hydrophilic coating even if the solvent is removed. If the antibiotic or germicide is sufficiently heat stable it can be added to the casting syrup and thus be incorporated in the product when the hydrophilic material is polymerized. However most antibiotics are not sufficiently heat stable to permit such technique.

Examples of suitable antibiotics and germicides which can be used include penicillin, neomycin, sulfate, cephalothin (Keflin), Bacitracin, phenoxymethyl, penicillin, lincoymycin hydrochloride, sulfadiazine, methyl sulfadiazine, succinoylsulfathiazole, phthalylsulfathiazole, sulfacetamide, procaine penicillin, streptomycin, aureomycin, terramycin, quaternary ammonium halides, e.g. trimethyl benzyl ammonium chloride, cetyl pyridinium chloride, triethyl dodecyl ammonium bromide, hexachlorophene.

The hydrophilic monomer employed is preferably a hydroxy lower alkyl acrylate or methacrylate, hydroxy lower alkoxy lower alkyl acrylate or methacrylate, e.g. 2-hydroxyethyl acrylate, 2-hydroxyethyl methacrylate, diethylene glycol monomethacrylate, diethylene glycol monoacrylate, 2-hydroxypropyl acrylate, 2-hydroxypropyl methacrylate, 3-hydroxypropyl acrylate, 3-hydroxypropyl methacrylate, dipropylene glycol monomethacrylate.

In preparing hydroxyalkyl monoacrylates and methacrylates a small amount of the diacrylate of dimethacrylate is also formed. This need not be removed and in fact its presence is frequently helpful in forming coatings which adhere securely to the catheter.

When cross-linked hydrophilic polymers are prepared preferably the cross-linking agent is present in an amount of 0.1 to 2.5%, most preferably not over 2.0%, although up to 15% or even 20% of cross-linking agent can be used. Typical examples of cross-linking agents include copolymerizable polyethylenically unsaturated compounds, e.g. ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol diacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl malate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine, triallyl phosphite, diallyl ester of benzene phosphonic acid, polyester of maleic anhydride with triethylene glycol, polyallyl glucose, e.g. triallyl glucose, polyallyl sucrose, e.g. pentaallyl sucrose, sucrose diacrylate, glucose dimethacrylate, pentaerythritol tetraacrylate, sorbitol dimethacrylate, diallyl aconitate, divinyl citraconate, diallyl fumarate.

Unless otherwise indicated all parts and percentages are by weight.

As catalysts for carrying out the polymerization there is employed a free radical catalyst in the range of 0.05 to 1% of the polymerizable hydroxyalkyl ester or the like. The preferred amount of catalyst is 0.1 to 0.2% of the monomer. Usually only a portion of the catalyst, e.g. 10-20% is added initially to the monomer and the balance is added to the casting syrup after partial polymerization. Typical catalysts include t-butyl peroctoate, benzoyl peroxide, isopropyl percarbonate, methyl ethyl ketone peroxide, cumene hydroperoxide, and dicumyl peroxide. Irradiation, e.g., by ultra violet light or gamma rays, also can be employed to catalyze the polymerization. Polymerization can be done at 20 to 150° C., usually 40 to 90° C.

The invention will be understood best in connection with the drawings wherein:

FIG. 1 is a longitudinal view of a ureteral catheter treated according to the invention;

FIG. 2 is a sectional view along the line 2—2 of FIG. 1; and

FIG. 3 is a sectional view of a catheter similar to that of FIG. 1 but wherein an antibiotic is incorporated in the coating.

Referring more specifically to FIGS. 1 and 2 of the drawings there is provided a conventional constant drainage indwelling Foley ureteral catheter 10 made of natural rubber. It has an inner closure end portion 12 provided in opposite thereof with opposed ports 14 which communicate with the axial passage or lumen 16 that is coextensive in length with the length of the catheter. The outer end 18 of the catheter 10 is open and of larger diameter than the main flexible body of the catheter. An inflatable retaining bag or balloon 20 encompasses the tube 22 of the catheter at a point inwardly of ports or openings 14 and is sealed or otherwise connected thereto in conventional fashion. A longitudinally extending small air tube 24 and indicated by the dotted line in FIG. 1 is positioned within the catheter and communicates at its inner end through a lateral opening (not shown) in the wall of the catheter with the interior of the inflatable bag 20. The air tube 24 has an outwardly extending lateral valve end portion or arm 26 that projects from one side of the catheter and terminates in a flared tubular portion 28.

The Foley catheter 10 is immersed in a casting syrup which contains a partial polymer of 98.5% 2-hydroxyethyl methacrylate and 1.5% of ethylene glycol dimethacrylate. The catheter is immersed with tip end 12 down to a depth within 2 inches of the valve branch 30. The catheter is then removed, allowed to drain and the coating cured in an oven to form inner coating layer 32. The coated portion of the catheter is indicated by the arrows in FIG. 1. In addition to the coating on the outside of the catheter, there is a similar coating formed on the inside of the catheter as a result of the syrup entering at the ports 14.

After coating layer 32 is cured the catheter is dipped again in the casting syrup, removed therefrom and the new outer coating layer 34 cured.

FIG. 3 shows a Foley catheter similar to that illustrated in FIGS. 1 and 2. However, after the coating 34 is cured the catheter is immersed in an antibiotic soultion, e.g. aqueous penicillin, and dried so that penicillin 36 is retained homogeneously distributed in the coating layers 32 and 34.

Typical examples of casting syrups suitable for coating catheters are set forth in Examples 1–17 below.

EXAMPLE 1

A solution was made of 100 parts of 2-hydroxyethyl acrylate, 0.2 part of ethylene glycol dimethacrylate and 0.4 part of t-butyl peroctoate.

EXAMPLE 2

A solution was made of 100 parts of an isomeric mixture of hydroxyisopropyl methacrylates, 0.2 part propylene glycol dimethacrylate and 0.4 part of t-butyl peroctoate.

EXAMPLE 3

100 parts of 2-hydroxyethyl methacrylate was stirred with 0.05 part of t-butyl peroctoate in a nitrogen atmosphere at a temperature of 40° C. for 30 minutes. The resultant mixture was cooled to 25° C. and t-butyl peroctoate added so as to make the total amount of t-butyl peroctoate added in the system 0.15 part. 0.1 part of ethylene glycol dimethacrylate was also added along with the second addition of the t-butyl peroctoate.

EXAMPLE 4

The process of Example 3 was repeated, substituting 0.2 part of 1,3-butylene glycol dimethacrylate in place of the ethylene glycol dimethacrylate as the cross linking monomer.

EXAMPLE 5

100 parts of 2-hydroxyethylmethacrylate was stirred with 50 parts of distilled water and 0.1 part of t-butyl peroctoate in an anaerobic atmosphere at a temperature of 40° C. for 20 minutes. The resultant mixture was cooled to 25° C. and 0.05 part of t-butyl peroctoate added and at the same time there was added 0.2 part of ethylene glycol dimethacrylate as a cross linking monomer.

EXAMPLE 6

The process of Example 5 was repeated in the absence of water, to give a casting syrup.

EXAMPLE 7

The process of Example 6 was repeated but the initial catalyst consisted of a mixture of 0.05 part t-butyl peroctoate and 0.1 part of isopropyl percarbonate. The added catalyst was 0.05 part of isopropyl percarbonate.

EXAMPLE 8

100 grams of distilled 2-hydroxyethyl methacrylate was stirred with 0.1 gram of t-butyl peroctoate in an anaerobic atmosphere at 25–70° C. for 15–40 minutes. The resultant mixture was cooled to 25° C. and t-butyl peroctoate added so as to make the total concentration of t-butyl peroctoate in the system 0.2 gram per 100 grams of 2-hydroxyethyl methacrylate. Ethylene glycol dimethacrylate in the concentration of 0.2 gram per 100 grams of 2-hydroxyethyl methacrylate was added at the same time as the catalyst concentration was increased.

EXAMPLE 9

The process of Example 8 was followed, substituting hydroxypropyl methacrylate for the 2-hydroxyethyl methacrylate.

EXAMPLE 10

The process of Example 8 was followed using isopropyl percarbonate as the catalyst and substituting 1,3-butylene glycol dimethacrylate for the ethylene glycol dimethacrylate as the cross linking monomer.

EXAMPLE 11

Suitably purified 2-hydroxyethyl methacrylate was stirred with 0.15 gram of isopropyl percarbonate in an anaerobic atmosphere at ambient temperature. Ethylene glycol dimethacrylate in the concentration of 0.1 gram per 100 grams of 2-hydroxyethyl methacrylate was added.

EXAMPLE 12

100 parts of 2-hydroxyethyl methacrylate was stirred with 0.05 part t-butyl peroctoate in a nitrogen atmosphere at a temperature of 30° C. for 30 minutes. The resultant mixture was cooled to 25° C. and additional peroctoate added to make up a total of 0.15 part, there being added at the same time 0.1 part of ethylene glycol dimethacrylate.

EXAMPLE 13

100 grams of 2-hydroxyethyl methacrylate was mixed with 0.20 gram of t-butyl peroctoate in an inert atmosphere and 0.20 gram of ethylene glycol dimethacrylate was added.

EXAMPLE 14

100 grams of 2-hydroxyethyl methacrylate was stirred with 0.1 gram of t-butyl peroctoate and 0.15 gram of ethylene glycol dimethacrylate was added.

EXAMPLE 15

100 grams of purified 2-hydroxyethyl methacrylate was mixed with 15 grams of ethylene glycol dimethacrylate and 0.3 gram of t-butyl peroctoate.

EXAMPLE 16

In a 5 gallon resin kettle there was placed 10 kilograms of 2-hydroxyethyl methacrylate, 150 grams of ethylene glycol dimethacrylate and 4.0 grams of t-butyl peroctoate. The kettle was heated to 95° C. with stirring over a 50 minute period, whereupon the reaction mixture was rapidly cooled, yielding a syrup having a viscosity of 420 centipoises at 30° C. To the syrup was added 20 grams of ethylene glycol dimethacrylate and 20 grams of t-butyl peroctoate, and the syrup was stirred until a homogenous solution was obtained.

This syrup was useful in coating both ureteral and cannulae catheters made of rubber and other flexible polymers. Among the cannulae catheters were Levine tubes, catheters for giving transfusions, removing blood, supplying saline solution to the body, etc.

EXAMPLE 17

The procedure of Example 16 was repeated replacing the ethylene glycol dimethacrylate by an equal weight of divinyl benzene. The resulting syrup was equally useful for coating ureteral and cannulae catheters with the syrup of Example 16.

EXAMPLE 18

A rubber Foley catheter was immersed in the casting syrup of Example 8 and then removed and subjected to a temperature of 80° C. in an inert atmospheric to effect polymerization of the coating thus applied. The coated catheter was then immersed in an aqueous solution of neomycin sulfate (25 grams per 100 ml. of water) and then dried to provide a catheter effective in preventing infections when used in the urinary tract.

EXAMPLE 19

A No. 24 natural rubber Foley catheter having a weight of 16.55 grams was wiped with xylene and immersed tip down in the syrup of Example 16 to a depth of within 2 inches of the valve branch. The catheter was removed, allowed to drain 5 minutes, and the coating thus was cured in an oven at 275° F. (134° C.) for 15 minutes. The catheter then weighed 16.71 grams, or exhibited a gain in weight of 0.16 gram. The catheter was then dipped into the syrup a second time, drained 5 minutes and cured at 275° F. for 15 minutes. The weight increased to 16.88 grams for an overall coating weight of 0.33 gram. After 30 seconds immersion in water, the coating was tough, flexible and strongly adherent to the rubber substrate.

Obviously the dipping can be repeated 2, 3, 4, 5 or more times to build up the thickness of the hydrophilic coating.

EXAMPLE 20

The procedure of Example 19 was repeated using the casting syrup of Example 17 to give a coated Foley catheter.

EXAMPLE 21

The procedure of Example 19 was repeated using a No. 16 Foley catheter. The catheter before coating weighed 11.70 grams and weighed 11.90 grams after coating.

EXAMPLE 22

A solution of 10 grams of cephalothin (Keflin, Lilly) in 40 ml. of water was prepared. The catheter coated in accordance with Example 21 was immersed in the antibiotic solution for 10 minutes, removed, wiped free of surface moisture and weighed. A weight gain of 0.42 gram was obtained. After drying, a net weight gain of 0.09 gram was recorded, indicating a pickup of 90 mg. of the antibiotic.

This catheter when hydrated and inserted in the urethra and bladder of a male patient resulted in suppression of the bacteria content of the urine for a 7 day period after insertion.

EXAMPLE 23

Example 22 was repeated using a 10 gram solution of neomycin sulfate in 40 ml. of water in place of the cephalothin solution. Equivalent results were obtained.

EXAMPLE 24

Example 22 was repeated using Bacitracin in place of the cephalothin with equivalent results.

The use of the hydrophilic polymer permits the slow release of the antibiotic or germicide when such compounds are used to impregnate the hydrophilic polymer coating.

What is claimed is:

1. A process of preparing a flexible ureteral, urethral or cannulae infection preventing tubular catheter made of natural or synthetic rubber or flexible polyvinyl chloride having an adherent solid external coating of a polymeric compound of the group consisting of hydrophilic acrylate and methacrylate polymers comprising applying a liquid casting syrup coating of the hydrophilic acrylate or methacrylate to the catheter and then completing the polymerization of the hydrophilic acrylate or methacrylate to form a solid coating.

2. A process according to claim 1 wherein the polymeric compound is selected from the group consisting of polymers of hydroxy lower alkyl acrylates, hydroxy lower alkyl methacrylates, hydroxy lower alkoxy lower alkyl acrylates, and hydroxy lower alkoxy lower alkyl methacrylates.

3. A process according to claim 2 wherein the catheter is made of rubber and the coating is allowed to swell the rubber prior to completing the polymerization.

4. A process according to claim 3 wherein the coating liquid includes a copolymerizable polyethylenically unsaturated monomer in an amount of 0.1 to 2.5% as a cross-linking agent.

5. A process according to claim 4 wherein a second liquid coating of a hydrophilic acrylate or methacrylate is applied over the first solid coating and is then polymerized to form a solid coating thereon.

6. A process according to claim 5 wherein the second coating is the same hydrophilic polymer as the first coating.

7. A process according to claim 6 wherein the second coating is a different hydrophilic polymer from that of the first coating.

8. A process of preparing a coated catheter according to claim 2 having an antibiotic or germicide in the coating comprising immersing the solid coated catheter into a liquid solution of an antibiotic or germicide to obtain a catheter having said solid coating impregnated with said antibiotic or germicide.

9. A process according to claim 8 including the additional step of drying the catheter whereby the liquid of said solution is removed but the antibiotic or germicide is retained in the hydrophilic polymer.

10. A process according to claim 2 wherein the polymerization is completed by heating.

11. A process of adhering a compound of the group consisting of hydrophilic acrylates and methacrylates to a rubber substrate comprising swelling the rubber with a liquid casting syrup mixture of said acrylate or methacrylate and a minor amount up to 20% of a copolymerizable polyethylenically unsaturated compound as a cross-linking agent and then completing the polymerization to form a solid adherent coating on said rubber substrate.

12. A process according to claim 11 wherein the polymeric compound is selected from the group consisting of polymers of hydroxy lower alkyl acrylates, hydroxy lower alkyl methacrylates, hydroxy lower alkoxy lower alkyl acrylates, and hydroxy lower alkoxy lower alkyl methacrylates.

13. A process according to claim 12 wherein the polymerization is completed by heating.

14. A process according to claim 12 wherein the rubber is natural rubber.

References Cited

UNITED STATES PATENTS

| | | | |
|---|---|---|---|
| 2,976,576 | 3/1961 | Wichterle et al. | 128—214 R X |
| 3,220,960 | 11/1965 | Wichterle et al. | 128—127 X |
| 3,364,164 | 1/1968 | Lyons | 117—161 UC X |
| 2,285,980 | 6/1942 | Jeckel | 128—349 R |
| 2,237,218 | 4/1941 | Flynn | 128—349 R |
| 3,470,615 | 10/1969 | Petner | 117—161 UC X |

RALPH HUSACK, Primary Examiner

U.S. Cl. X.R.

117—138.8 UA, 139, 161 UB, 161 UC; 148—348, 349 R; 424—14, 81